US012180373B2

(12) United States Patent
Han et al.

(10) Patent No.: US 12,180,373 B2
(45) Date of Patent: Dec. 31, 2024

(54) MICROCAPSULE CONTAINING COLOR PARTICLES AND PRINT MEDIUM INCLUDING THE SAME

(71) Applicant: SOCIÉTÉ BIC, Clichy (FR)

(72) Inventors: Seung Hun Han, Gyeonggi-do (KR); Jae Hyun Joo, Gyeonggi-do (KR); Jiyoung Ryu, Gyeonggi-do (KR)

(73) Assignee: SOCIÉTÉ BIC, Clichy (FR)

( * ) Notice: Subject to any disclaimer, the term of this patent is extended or adjusted under 35 U.S.C. 154(b) by 1052 days.

(21) Appl. No.: 17/252,025

(22) PCT Filed: Jun. 13, 2019

(86) PCT No.: PCT/EP2019/065558
§ 371 (c)(1),
(2) Date: Dec. 14, 2020

(87) PCT Pub. No.: WO2019/238855
PCT Pub. Date: Dec. 19, 2019

(65) Prior Publication Data
US 2021/0189139 A1    Jun. 24, 2021

(30) Foreign Application Priority Data
Jun. 14, 2018   (KR) .................. 10-2018-0067835

(51) Int. Cl.
| | |
|---|---|
| *C09D 11/00* | (2014.01) |
| *B41M 3/14* | (2006.01) |
| *B41M 5/28* | (2006.01) |
| *C09B 67/02* | (2006.01) |
| *C09D 11/037* | (2014.01) |
| *C09D 11/50* | (2014.01) |

(Continued)

(52) U.S. Cl.
CPC .......... *C09B 67/0097* (2013.01); *B41M 3/14* (2013.01); *B41M 5/287* (2013.01); *C09D 11/037* (2013.01); *C09D 11/50* (2013.01); *B82Y 30/00* (2013.01); *B82Y 40/00* (2013.01)

(58) Field of Classification Search
CPC ..... C09B 67/0097; B41M 3/14; B41M 5/287; C09D 11/037; C09D 11/50; B82Y 30/00; B82Y 40/00
USPC ....................... 106/31.01, 31.13, 31.6, 31.65
See application file for complete search history.

(56) References Cited

FOREIGN PATENT DOCUMENTS

| | | |
|---|---|---|
| KR | 10-1340360 | 12/2013 |
| KR | 10-2015-0020491 | 2/2015 |

(Continued)

OTHER PUBLICATIONS

International Search Report dated Oct. 18, 2019 in corresponding International PCT Patent Application No. PCT/2019/EP065558, 6 pgs.

(Continued)

*Primary Examiner* — James E McDonough
(74) *Attorney, Agent, or Firm* — Ruggiero McAllister & McMahon LLC

(57) ABSTRACT

Disclosed is a microcapsule composed of a transparent capsule wall material and configured to contain therein color particles selected from among color magnetic pigment particles and color pigment particles, magnetically color-tunable particles, and a solvent, thus exhibiting a superior structural color expression effect compared to a conventional microcapsule, and realizing a full range of colors, thereby enabling use thereof as a print medium.

20 Claims, 6 Drawing Sheets

(51) Int. Cl.
 *B82Y 30/00* (2011.01)
 *B82Y 40/00* (2011.01)

(56) References Cited

FOREIGN PATENT DOCUMENTS

| | | | |
|---|---|---|---|
| KR | 20150020491 A * | 2/2015 | |
| KR | 10-2017-0064917 | 6/2017 | |
| KR | 10-2017-0124763 | 11/2017 | |
| KR | 102018-0040206 | 4/2018 | |
| KR | 10-2018-0065206 | 6/2018 | |
| WO | WO-2014086495 A1 * | 6/2014 | .............. B41M 3/14 |

OTHER PUBLICATIONS

Written Opinion dated Oct. 18, 2019 in corresponding International PCT Patent Application No. PCT/2019/EP065558, 6 pgs.

\* cited by examiner (a)

(b)

(c)

MICROCAPSULE CONTAINING COLOR PARTICLES AND PRINT MEDIUM INCLUDING THE SAME

CROSS REFERENCE TO RELATED APPLICATIONS

This application claims benefit of PCT Application No. PCT/EP2019/065558, filed on Jun. 13, 2019, which benefit of Korean Application No. KR 10-2018-0067835, filed on Jun. 14, 2018, the contents of both of which are incorporated herein by reference in their entireties.

BACKGROUND OF THE DISCLOSURE

1. Field of the Disclosure

The present disclosure relates to a microcapsule having color particles, magnetically color -tunable particles, and a solvent, and to various products, devices and methods utilizing the same. The present disclosure relates in particular to a microcapsule in which the color particles are color magnetic pigment particles which may be unevenly distributed in the capsule by means of external force, such as a magnetic or electric field, whereas the magnetically color -tunable particles contained in the capsule may be rearranged to a photonic crystal structure in response to the external force. The microcapsule of the present disclosure may facilitate realizing a full range of structural colors and a wide range of contrast.

2. Description of the Prior Art

A variety of product authentication or anti-counterfeiting media are being developed using materials, the color of which is changed by the application of external force, such as an electric field, a magnetic field, gravity, etc. Such a medium may be exemplified by a device, as disclosed in Korean Patent No. 10-1340360, comprising a first part configured such that a color-changeable region including a color-changeable material, the color of which is adjusted depending on the direction or magnitude of a magnetic field that is applied thereto, is formed on at least a portion thereof, and a second part configured such that a magnetic-field generation region is formed on at least a portion thereof, whereby the color of the color-changeable region is adjusted depending on the direction or magnitude of a magnetic field.

The rearrangement of the color-changeable material by external force (an electric field, a magnetic field, gravity, etc.), which is regarded as very essential in terms of operating a color-changeable device, is efficiently controlled to thus obtain desired color-changing effects, and a more efficient color-changeable device is being developed through various design changes.

In order to induce color-changing effects, a magnetically color-tunable material (magnetically color-tunable photonic crystal (MTX)) is used. Such a magnetically color-tunable material is provided in the form of ink including particles or microcapsules, based on the characteristic of photonic crystals whereby particles are rearranged due to external force. Here, the problems to be solved in a medium printed with the magnetically color-tunable particles are to improve visual effects by increasing color contrast based on color change and to realize a full range of colors.

With the goal of improving color-changing effects, a variety of security media have been developed by the present applicant. For example, Korean Patent Application No. 10-2018-0065206 discloses a security medium encoding coded security information by enabling a color, a pattern, an image and/or data to be varied depending on the observation angle, and Korean Patent Application No. 10-2018-0040206 discloses a security medium that is able to simultaneously exhibit color-changing effects and hologram effects using hologram foil including a magnetically color-tunable pigment.

The variety of security media may be utilized for diverse security applications by optimizing the structure able to exhibit color-changing effects, but limitations are imposed on realizing a full range of structural colors, and problems in which color contrast visual effects are insufficient still remain.

SUMMARY OF THE DISCLOSURE

In one aspect, the present disclosure is directed towards a microcapsule composed of a transparent capsule wall material comprising therein color particles. The color particles may be selected from among color magnetic pigment particles and color pigment particles. The microcapsule may further comprise magnetically color-tunable particles. The microcapsule may further comprise a solvent.

In some embodiments in which the microcapsule comprises color magnetic pigments, the color magnetic pigment particles may be configured to unevenly distribute within the microcapsule in response to application of an external magnetic or electric field. The magnetically color-tunable particles may be configured to rearrange to a crystal structure in response to the application of the external magnetic or electric field.

In some embodiments, the magnetically color-tunable particles may be electrically charged nanoparticles.

In some embodiments, the microcapsule may further contain at least one of a fluorescent pigment and a thermochromic pigment.

In some embodiments, the solvent may be a curable solvent.

In some embodiments in which the solvent is a curable solvent, the microcapsule may further contain a photopolymerization initiator or a thermal polymerization initiator.

In a further aspect, the present disclosure is directed towards a print medium which includes the above microcapsule.

In a further aspect, the present disclosure is directed towards a method of printing a composition comprising the above microcapsules and curable composition onto a printable medium. The method may comprise ejecting the composition onto a printable medium. The The method may comprise applying a magnetic field to the composition to control the color of the magnetic-color-changeable microcapsules. The method may comprise curing the ejected composition, wherein curing is initiated by any one selected from among thermal energy, light energy, and chemical energy. The aforementioned steps may be carried out in any order.

In a further aspect, the present disclosure is directed towards a printing device for printing a composition onto a printable medium. The device may comprise a cartridge including a curable composition comprising above microcapsules. The device may comprise an ejection unit for ejecting the composition from the cartridge. The device may comprise a magnetic field generation unit for applying a magnetic field to the composition ejected from the ejection unit. The device may comprise an energy regulation unit for generating and/or blocking energy for curing the composition ejected from the ejection unit, wherein the energy generated from the energy regulation unit is any one selected from among thermal energy, light energy, and chemical energy.

In some embodiments, the printing device may be a handheld writing device. In some embodiments, the printing device may be a portable pen.

In a further aspect, the present disclosure is directed towards a security indicia. The security indicia may comprise the above microcapsule. Alternatively, the security indicia may comprise microcapsules composed of a transparent capsule wall material comprising therein color particles. The color particles may be selected from among color magnetic pigment particles and color pigment particles. The microcapsules may comprise magnetically color-tunable particles. The microcapsule may further comprise a cured resin matrix.

In a further aspect, the present disclosure is directed towards a method of authenticating a security indicia comprising the microcapsules as defined in the above first-mentioned aspect. The method may comprise assessing the color or contrast of the security indicia in a first state. The method may comprise applying an external magnetic or electric field to the security indicia to induce a second state in the security indicia. The method may comprise assessing the color or contrast of a security indicia in its second state. The method may comprise authenticating the security indicia by assessing the change in color or contrast of the security indicia between its first and second states as at least one criteria of the authentication. Alternatively, in a further aspect, the present disclosure is directed towards a method of authenticating a security indicia comprising the above microcapsules in a cured resin matrix. The method comprises authenticating the security indicia by assessing the color or contrast of the security indicia.

The microcapsules of any of the above-mentioned aspects may in particular be used to provide a print medium that exhibits color-changing effects, and, in particular, simultaneously manifests a structural color expression effect and a photonic crystal arrangement effect by the application of the external force to improve color contrast and facilitate the realization of a full range of colors.

DESCRIPTION OF SPECIFIC EMBODIMENTS

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

According to the present disclosure, a microcapsule may be provided which is composed of a transparent capsule wall material comprising therein color particles selected from among color magnetic pigment particles and color pigment particles; magnetically color-tunable particles; and a solvent.

The microcapsule may exhibit color-changing effects due to the application of external force, such as application of a magnetic or electric field, as exemplarily shown in FIGS. 1A to 1D.

Figure 1:
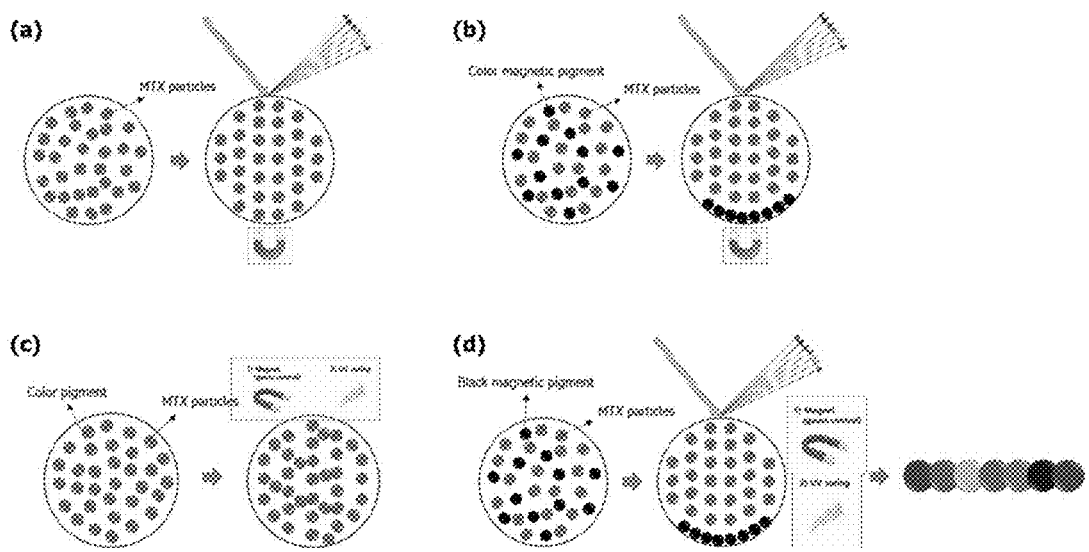
FIGS. 1A, 1B, 1C and 1D show the process of exhibiting color-changing effects of a conventional microcapsule containing MTX particles, a microcapsule containing color magnetic pigment particles, a microcapsule containing color pigment particles and a microcapsule containing black magnetic pigment particles, respectively.

FIG. 1A shows a conventional microcapsule, including magnetically color-tunable particles. The magnetically color-tunable particles are also called MTX particles, and may cause color-changing effects by producing reflected light at a predetermined wavelength through the formation of photonic crystals. Since the reflected light at a predetermined wavelength is produced through only the formation of the crystal structure based on the photonic crystal effects of the magnetically color-tunable particles, color-changing effects may be obtained in response to the application of the external force.

Moreover, as shown in FIG. 1B, the microcapsule according to the present disclosure may be configured such that the color magnetic pigment particles are unevenly distributed in response to application of the external force, in this case concentrated on one side of the microcapsule and depleted on the opposite side the microcapsule. Such an uneven distribution color magnetic pigment particles may realize a background color or light absorption color, thereby increasing the structural color expression based on the photonic crystal effects of the magnetically color-tunable particles.

Specifically, in the conceptual view showing color-changing effects when external force (magnetic field) is applied to the microcapsule, when a magnetic field is applied to the microcapsule in a state in which the color magnetic pigment particles and the magnetically color-tunable particles are randomly dispersed in the solvent contained in the microcapsule, the color magnetic pigment particles migrate according to the direction of the applied magnetic field and assume an uneven distribution within the microcapsule (in the embodiment: an agglomeration at the lower portion of the microcapsule). Simultaneously therewith, the magnetically color-tunable particles are able to form a certain crystal structure due to the photonic crystal effects.

Thus, the microcapsule according to the present disclosure may be configured such that, as shown in FIG. 1B, the color magnetic pigment particles are unevenly distributed on one side of the microcapsule to thus exhibit a background color or light absorption color, thereby increasing the structural color expression based on the photonic crystal effects of the magnetically color-tunable particles.

Also, FIG. 1C illustrates a process of causing color-changing effects in the microcapsule containing a color pigment. The microcapsule comprises therein a color pigment and magnetically color-tunable particles in random distribution, and the magnetically color-tunable particles are rearranged when an external magnetic field is applied thereto, thus forming a photonic crystal structure, in which the color pigment particles are distributed between photonic crystals. Accordingly, the color purity of the color pigment particles distributed in the photonic crystals may be increased.

The microcapsule of FIG. 1B contains color magnetic pigment particles, while the microcapsule of FIG. 1D black magnetic pigment particles. In this case, black magnetic pigment particles are unevenly distributed at the lower portion of the microcapsule, and may thus act as a background color. Accordingly, reflected light at a predetermined wavelength is produced depending on the arrangement of magnetically color-tunable particles, and the photonic crystal arrangement of magnetically color-tunable particles may vary depending on the magnitude of a magnetic field. Hence, a desired original color may be exhibited by adjusting the magnetic field that is applied from the outside. In the microcapsule of FIG. 1D, an original color is realized while the black magnetic pigment particles act as the background color, thus remarkably improving the structural color expression and increasing the color contrast effect compared to the microcapsule including only the magnetically color-tunable particles.

In line with the above exemplary embodiments according to the first aspect of the present disclosure, there is provided a microcapsule comprising color magnetic pigments, magnetically color-tunable particles and a solvent, wherein the color magnetic pigment particles are configured to unevenly distribute within the microcapsule in response to application of an external magnetic or electric field. In particular, the color magnetic pigment may be sufficiently mobile within a given solvent to be able to unevenly distribute within the microcapsule in a time frame that is typical for printing applications, e.g. less than about 60 seconds, or about 1 to about 10 seconds, or about 0.01 to about 5 seconds, or less than about 3 seconds. Since the migration rate may depend not only on the size, shape, and surface composition of the color magnetic pigment, configuring the particles to unevenly distribute within the microcapsule may also involve configuring the microcapsule for that purpose, e.g. suitably adjusting the size of the microcapsule and the viscosity of the solvent, to ensure that an uneven distribution can be achieved within a suitable time frame. From the foregoing, it should also be understood that configuring the color magnetic pigment particles to unevenly distribute within the microcapsule in response to application of an external magnetic or electric field may also imply that the particles are not unevenly distributed (e.g. randomly distributed) prior to application of the external magnetic or electric field. Furthermore, the magnetically color-tunable particles are configured to rearrange to a crystal structure in response to the application of an external magnetic or electric field.

When referring to crystal structure of magnetically color-tunable particles, it is meant that the particles are capable of forming a desired spatial arrangement (e.g. as photonic crystal composed of nanoparticles) which is capable of reflecting/emitting a desired color.

In some embodiments, the magnetically color-tunable particles may be electrically charged nanoparticles. Electrically charging the nanoparticles may help in preventing agglomeration of the particles during storage and help in forming a photonic crystal structure upon application of the external magnetic or electric field.

In some embodiments, the color magnetic pigment particles may be nanoparticles configured to form a light-reflecting or light-absorbing layer in the microcapsule in response to the application of the external magnetic or electric field whereas the magnetically color-tunable particles are configured to retain a substantially random distribution of the crystal structures formed in response to the application of an external magnetic or electric field within the microcapsule.

The microcapsule further comprises a solvent. It should be understood that the particles dispersed in the microcapsule are very small in size and, thus, may be at the boundary of dispersion or suspension and true solution. The present application refers to both "dispersion" and "solution" but, for the purposes of this disclosure, these terms should be construed as being synonymous. Likewise, the present disclosure refers to "solvent", "solved", and "curable solvent" and these terms should be construed as equally encompassing dispersions, suspensions, and dispersed and suspended particles.

In some embodiments, the solvent may be a non-reactive solvent. In some embodiments, the solvent may be a curable solvent, i.e. the solvent may comprise components which are capable of polymerizing to a resin matrix which encloses various particles contained within the microcapsule. Enclosing the particles within a matrix may be desirable in applications in which the color/contrast effects achieved by application of the external magnetic or electric field are intended to be longer-lasting or even permanent.

The magnetically color-tunable particles may realize such effects using particles responding to an electromagnetic field, such as nanoparticles, color nanoparticles (i.e. inherently colored nanoparticles), a color nano-composite, or a microcapsule including the nano-particles, color nano-particles, or color nano-composite.

In the present disclosure, the microcapsule including nano-particles, color nano-particles, or color nano-composite, which may exhibit the photonic crystal effects, is used. This is because an additional component, such as color magnetic pigment particles, etc., is contained in the microcapsule, in addition to the MTX particles.

The color nano-composite may be advantageous because a color may be realized through the original color of particles due to colorant particles contained in the nanocomposite, and thus there is a wide choice of colors compared to nanoparticles showing a single color. In coincidence therewith, the nanocomposite is rearranged or an electric charge thereof is varied by the application of an electric field or a magnetic field from the outside, like the nanoparticles, thereby transmitting or reflecting light at a predetermined wavelength to ultimately exhibit a color. In some embodiments, the color nanocomposite may have a uniform particle size in order to realize a color through rearrangement of particles or variation in an electric charge thereof, and has to facilitate rearrangement by virtue of high mobility thereof in a medium.

The magnetically color-tunable particles may be solved or dispersed in a medium, may be present in the form of electrically charged particles dispersed in a medium, or may be provided in the form of a core-shell structure or a multi-core-shell structure. For such dispersion, the magnetically color-tunable pigments may have a particle size of about 50 to about 1,000 nm, in particular about 100 to about 500 nm, and more specifically about 100 to about 300 nm. The magnetically color-tunable particles may generally have a spherical or substantially spherical shape and, thus, their size can be determined by conventional means such as microscopy or electron microscopy. In these cases, the measured 2-dimensional representation of the particle diameter may be seen as representative for the afore-mentioned size of the magnetically color-tunable particle.

When the particles include a colorant, the uniformity of particles may be regarded as more important, rather than the size of particles, and thus the particles may also have a particle size falling outside of the above-mentioned ranges.

As already mentioned, the present disclosure may make use of nanoparticles. Nanoparticles may be of any type, including conductive particles, metal particles, organic metal particles, metal oxide particles, magnetic particles, or hydrophobic organic polymer particles, and may be particles that exhibit photonic crystal characteristics by the application of external energy (in case that the nanoparticle is a magnetically color-tunable particle). Examples thereof may include at least one metal of silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), zinc (Zn), and zirconium (Zr), or nitrides or oxides thereof.

Also, the organic nanoparticles may be composed of a polymer material, such as polystyrene, polyethylene, polypropylene, polyvinyl chloride, or polyethylene terephthalate, and may include particles the surface of which is formulated with an organic compound having a hydrocarbon group, particles the surface of which is formulated with an organic compound having at least one of a carboxyl group, an ester group and an acyl group, particles the surface of which is formulated with a complex compound having a halogen element, particles the surface of which is formulated with a coordinate compound including amine, thiol or phosphine, and electrically charged particles having a radical formed on the surface thereof.

The nanoparticles may be particles having electrical polarization properties. Specific examples thereof may include a ferroelectric material, in which an extent of polarization is significantly increased by additionally inducing the polarization of an ion or atom when an external magnetic field or electric field is applied for polarization with the medium and also in which, even when an external magnetic field or an electric field is not applied, remnant polarization is present and hysteresis remains in the direction of application of a magnetic field or an electric field; and a paraelectric material or superparaelectric material, in which an extent of polarization is significantly increased by additionally inducing the polarization of an ion or atom when an external magnetic field or electric field is applied, but remnant polarization and hysteresis are not present when an external magnetic field or electric field is not applied.

For example, a material having a perovskite structure may be included. Examples of the material having an $ABO_3$ structure may include $PbZrO_3$, $PbTiO_3$, $Pb(ZrTi)O_3$, $SrTiO_3$, $BaTiO_3$, $(Ba,Sr)TiO_3$, $CaTiO_3$, $LiNbO_3$, etc.

Also, the nanoparticles may include particles containing a single metal or different metals, oxide particles or photonic crystal particles.

In the case of metals, a magnetic precursor selected from the group consisting of a metal nitrate compound, a metal sulfate compound, a metal fluoroacetoacetate compound, a metal halide compound, a metal perchlorate compound, a metal sulfamate compound, a metal stearate compound and an organometallic compound and a ligand selected from the group consisting of an alkyltrimethylammonium halide-based cationic ligand, a neutral ligand such as an alkyl acid, trialkylphosphine, trialkylphosphine oxide, alkylamine and alkylthiol, and an anionic ligand such as sodium alkyl sulfate, sodium alkyl carboxylate, sodium alkyl phosphate and sodium acetate are dissolved in a solvent to prepare an amorphous metal gel, which is then heated so as to be phase-converted into crystalline particles.

Here, when the heterogeneous precursor is contained in this way, the magnetic properties of the finally obtained particles may be enhanced, or a variety of magnetic materials such as superparamagnetic, paramagnetic, ferromagnetic, antiferromagnetic, ferrimagnetic and diamagnetic materials may be obtained.

The magnetically color-tunable particles, which are dispersed in the solvent, are rearranged by the application of an electric field or a magnetic field, and the solvent may include a polar or nonpolar solvent. Also, the color magnetic nanoparticles are dispersed in the solvent, and are thus moved and unevenly distributed by the application of an electric field or a magnetic field.

Also, the magnetically color-tunable particles may include a material, which becomes magnetic, that is, is magnetized, due to the application of a magnetic field. In order to prevent magnetic particles from agglomerating when an external magnetic field is not applied, a superparamagnetic material may be used, in which magnetization occurs when an external magnetic field is applied, but remnant magnetization is not present when an external magnetic field is not applied.

Also, in order to efficiently disperse the nanoparticles in the solvent and to prevent agglomeration thereof, the surface of the particles may be coated with electric charges having the same polarity, and in order to prevent the particles from being precipitated in the solvent, the surface of the particles may be coated with a material having a specific gravity different from that of the corresponding particles, or the solvent may be mixed with a material having a specific gravity different from that of the corresponding particles.

Moreover, the nano-particles may be configured to have a specific color so as to reflect light at a specific wavelength. More specifically, the particles according to the present disclosure may be imparted with a specific color by controlling the oxidation number or coating with an inorganic pigment, a dye or the like. For example, an inorganic pigment applied on the particles according to the present disclosure may include oxides, sulfides and sulfates of Zn, Pb, Ti, Cd, Fe, As, Co, Mg, Al and the like, including a chromophore, and a dye applied on the particles according to the present disclosure may include a fluorescent dye, an acidic dye, a basic dye, a mordant dye, a sulfide dye, a vat dye, a disperse dye, a reactive dye and the like.

Furthermore, the nanoparticles may be coated with an electrically charged material so as to have the same electric charge as each other.

The solvent of the microcapsule may include a non-reactive solvent. The solvent may be at least one selected from among water, methanol, ethanol, propanol, butanol, propylene carbonate, toluene, benzene, hexane, chloroform, halocarbon oil, perchloroethylene, trichloroethylene, and isoparaffin oil, such as isopar-G, isopar-M, or isopar-H.

The solvent of the microcapsule may include a curable solvent.

In some embodiments, the curable solvent may have a weight-average molecular weight of about 100 g/mol to about 1,000 g/mol. It should be understood that the term "curable solvent" should be broadly construed and is in particular meant to not only include sufficiently mobile polymers but also to include monomers and oligomers (number of repeat units=2 to 8). In case of polymers and oligomers, the term "weight-average molecular weight" refers to the molecular weight of each repeat unit. In case of monomers, the term refers to the molecular weight of the entire monomer.

In some embodiments. the resin contained in the curable solvent may have a weight-average molecular weight of about 100 g/mol to about 800 g/mol, in particular about 100 g/mol to 600 g/mol, specifically about 100 g/mol to 400 g/mol.

In some embodiments, the resin may be composed of mixtures of multiple components. In those cases, the weight-average molecular weight of the resin is meant to refer to the (weight-average) molecular weight of the curable components (i.e. excluding polymerization initiators and additives such as a dispersant) and each such component, by itself, has to satisfy the molecular weight requirement. To give an example: The curable solvent is composed of 94 wt.-% 1,6-hexanediol diacrylate, 3 wt.-% of poly(methyl methacrylate) having a molecular weight of about 5,000, 2 wt. % dispersant and 1 wt.-% of a photopolymerization initiator. A curable solvent comprising such a resin would have the required weight-average molecular weight of about 100 g/mol to about 1,000 g/mol since the weight-average molecular weight of poly(methyl methacrylate) resin is about 100 g/mol, the molecular weight of 1,6-hexanediol diacrylate is about 226 g/mol and the dispersant and the photopolymerization initiator are not relevant.

In some embodiments, the curable solvent may comprise monomers capable of forming a crosslinked resin. Such crosslinking may further facilitate the entrapment of the particles in the cured resin matrix and improve color stability. In some embodiments, the monomer capable of forming a crosslinked resin may be a monomer having at least two reactive functional groups. An exemplary definition of a "reactive functional group" in the aforementioned sense is a chemical group which is capable of forming a covalent bond with another (not necessarily the same) functional group under the applied polymerization conditions. Examples include crosslinkable ene-moieties, in particular acrylate and methacrylate moieties, epoxy moieties, amino moieties, thiol moieties, and isocyanate moieties. Of course, it is also possible to use mixtures, for instance UV-activated thiol/ene-click chemistry.

In some embodiments, the curable solvent may include a monomer which comprises at least two crosslinkable ene-moieties, in particular at least two acrylate or methacrylate moieties. In some embodiments, the monomer comprises at least two crosslinkable ene-moieties and each of the crosslinkable ene-moieties in the monomer is spaced less than 16, in particular less than 14, specifically less than 12, atoms apart, wherein the atoms are selected among C, N, O, and S.

The curable solvent may have a viscosity of about 5 to about 50 cps measured at about 25° C., in particular about 5 to about 40 cps, specifically about 5 to about 30 cps. In some embodiments, the curable solvent may have a viscosity, measured at about 25° C., of about 15 to about 50 cps, in particular of about 20 to about 50 cps, specifically about 25 to about 50 cps. The viscosity may be a dynamic viscosity determined using a Brookfield viscosimeter (such as a Brookfield DV2T) at about 25° C., using spindle SC4-31 at about 200 rpm and %-torque values of about 25 to about 35%.

In some embodiments, the curable solvent may comprise a polymerization initiator and optionally additives, such as a dispersant.

In some embodiments, the curable solvent may be photochemically or thermally curable to a thermosetting resin.

In some embodiments, the solvent may be a photocurable solvent including any one selected from among an acrylic resin, a methacrylic resin, an acrylic monomer, a methacrylic monomer, an acrylic monomer radical, a methacrylic monomer radical, an acrylic oligomer, and a methacrylic oligomer, each of which has a carbon double bond.

Also, the polymerization initiator may be a photopolymerization initiator or a thermal polymerization initiator. The photopolymerization initiator may include any one selected from among 1-hydroxycyclohexylphenylketone, bis(2,4,6-trimethylbenzoyl) phenylphosphine oxide, 2-methyl-1-[4-(methylthio)phenyl]-2-morpholinopropan-1-one, and 2,4-diethylthioxanothone. The thermal polymerization initiator may include any one azo compound selected from among 2,2'-azobis(isobutyronitrile), 1,1'-azobis(cyclohexane carbonitrile), 2,2'-azobis(2,4-dimethylvaleronitrile), 2,2'-azobis(methylbutyronitrile), di-tert-butyl peroxide, lauroyl peroxide, benzoyl peroxide, tert-butyl peroxide, azo-tert-butane, azo-bis-isopropyl, azo-normal-butane, di-tert-butyl peroxide, 2,2'-azobis(N-butyl-2-methylpropionamide), and 2,2'-azobis(N-cyclohexyl-2-methylpropionamide).

Further examples of a suitable photopolymerization initiator include benzophenone, a benzophenone derivative, acetophenone, an acetophenone derivative, benzyl ketone, α-alkoxy benzyl ketone, monomer hydroxyketone, polymer hydroxyketone, α-aminoketone, alkoxyketone, acyl phosphine oxide, metallocene, benzoin ether, benzyl ketal, α-hydroxyalkylphenone, α-aminoalkylphenone, and acylphosphine, all of which respond to UV light. Examples of a thermal polymerization initiator include an azo-based compound, an organic peroxide, and hydrogen peroxide.

The curable solvent may contain a dispersant, thereby improving the dispersibility of individual components of the solvent. Examples of the dispersant may in particular include wet dispersants, such as BYK-154, BYK-2095, BYK-9077, and the like.

In some embodiments, the curable solvent may further include other additives, for instance rheologic modifiers, wetting agents, and adhesion promoting agents. Some examples of adhesion promoting agents include, in particular, an epoxy resin having an ether bond, a urethane adhesive having a urethane bond, or a urethane monomer.

The individual components of the curable solvent may be used in any amount. In some embodiments, the curable solvent may be composed of 90 to 96 wt % of the resin, 1 to 8 wt % of the polymerization initiator, and 0.1 to 5 wt % of the dispersant.

In some embodiments, the curable solvent may be composed of about 90 to about 96 wt % of monomers, about 1 to about 8 wt % of a polymerization initiator, and about 0.1 to about 5 wt % of one or more additives. In some embodiments, the curable solvent may comprise or consist of about 90 to about 98.9 wt % monomers, about 1 to about 5 wt % of a polymerization initiator, and about 0.1 to about 5 wt % of additives. In some embodiments, the curable solvent may comprise or consist of about 90 to about 98.9 wt % of monomers, including at least one monomer capable of forming a crosslinked resin, in particular a monomer which comprises at least two crosslinkable ene-moieties; about 1 to about 5 wt % of a polymerization initiator; and about 0.1 to about 5 wt % of one or more additives.

The microcapsule of the present disclosure further comprises a transparent capsule wall, and the material for the capsule wall may include at least one of alginate, gelatin, ethyl cellulose, polyamide, melamine formaldehyde resin, poly(vinyl pyridine), polystyrene, resin having urethane bonding, and polymethyl methacrylate. When the capsule wall is formed of such a transparent polymer, reflected light at a specific wavelength may be obtained due to the color magnetic pigment particles and the magnetically color-tunable particles, which are rearranged by the application of a magnetic field, thereby displaying structural colors.

Such a microcapsule may include a microcapsule disclosed in Korean Patent Application Publication No. 10-2017-0124028 and microcapsules disclosed in Korean Patent Application Publication Nos. 10-2015-0031197, 10-2015-0017796 and 10-2015-0020491, developed by the present applicant, all of which may be applied both to an electrophoresis type and to a magnetic field application type, and may thus respond to an electromagnetic field that is applied from the outside.

Figure 2:
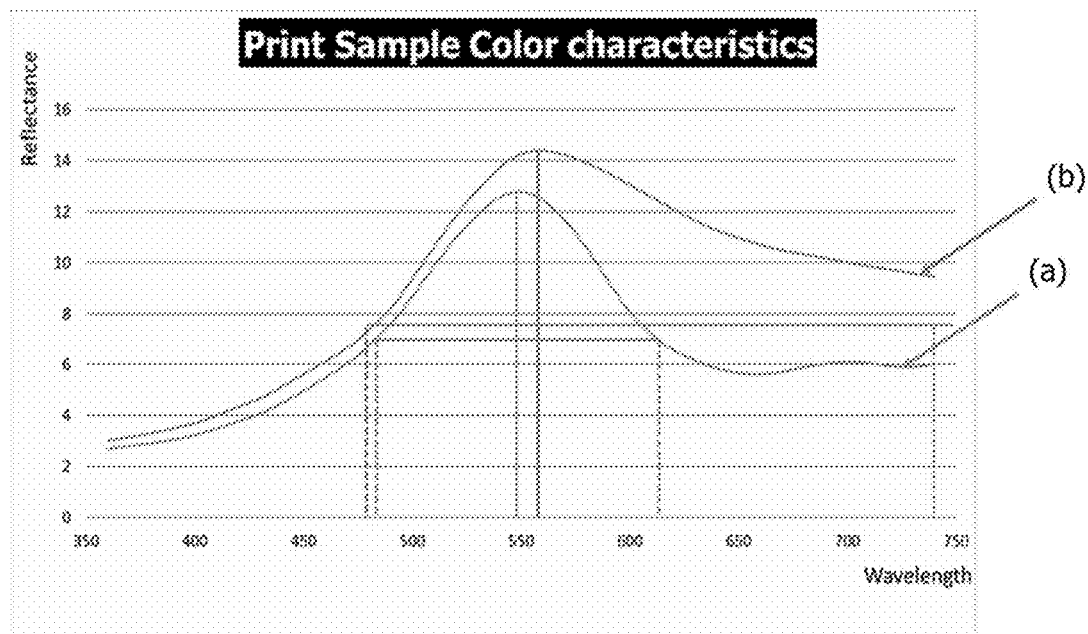
FIG. 2 is a graph showing the results of measurement of color purity of a microcapsule containing, as color magnetic pigment particles, a green pigment (a) and a conventional microcapsule (b)

In some embodiments, and as shown in the optical microscope image of FIG. 2B, the manufactured microcapsules may be formed to various sizes. In some embodiments, the microcapsules may have a size of about 0.5 μm to about 300 μm, in particular about 1 μm to about 100 μm, specifically about 10 to about 100 μm, or about 10 to about 50 μm, or about 10 μm to about 40 μm. The microcapsules may generally have a spherical or substantially spherical shape and, thus, their size can be determined by conventional means such as microscopy or electron microscopy. In these cases, the measured 2-dimensional representation of the microcapsule diameter may be seen as representative for the aforementioned size of the microcapsules.

In some embodiments, the microcapsules may have an average particle size of about 2 to about 100 μm, in particular about 3 to about 20 μm, in particular about 4 to about 10 μm. The average particle size may be determined as described in the preceding paragraph.

In some embodiments, the particle size may also be relatively uniformly distributed. This may further improve color impression by avoiding macroscopic irregularities. In some embodiments, the particle size distribution may be characterized by a D50 of about 20 μm.

In some embodiments, the microcapsule may further include at least one of a color pigment, a fluorescent pigment, and a thermochromic pigment, which may be dispersed in the solvent, in addition to the color magnetic pigment particles and the magnetically color-tunable particles.

Such an additional component is used so as to respond to external force, such as thermal energy, light energy, gravity, etc., in addition to the external force such as the electric field or the magnetic field, thereby realizing a greater variety of color- changing effects through mixing of additional components.

For example, when the color pigment is additionally contained, an uneven distribution effect due to gravity may be obtained based on a difference in specific gravity from that of the solvent. In this case, it may be mixed with the color magnetic pigment particles to thus exhibit a new color.

EXAMPLES AND FURTHER EMBODIMENTS

In order to compare the microcapsule including the color pigment particles and the MTX particles as shown in FIG. 1C with the conventional microcapsule (FIG. 1A), the absorbance spectra of the microcapsule including green pigment particles (FIG. 2A) and the microcapsule including the MTX particles (FIG. 2B) were measured, and are shown in FIGS. 2A and 2B. Based on the measurement results, a wide shoulder peak is observed at 550 nm or higher in the conventional microcapsule, but a sharp peak is observed in the peak top at 550 nm in the microcapsule of FIG. 1C. Such analytical results show an improvement in color purity of the microcapsule, and the use of a microcapsule having high wavelength uniformity of reflected light is expected to further increase the color contrast effect and the structural color expression effect.

Figure 3:
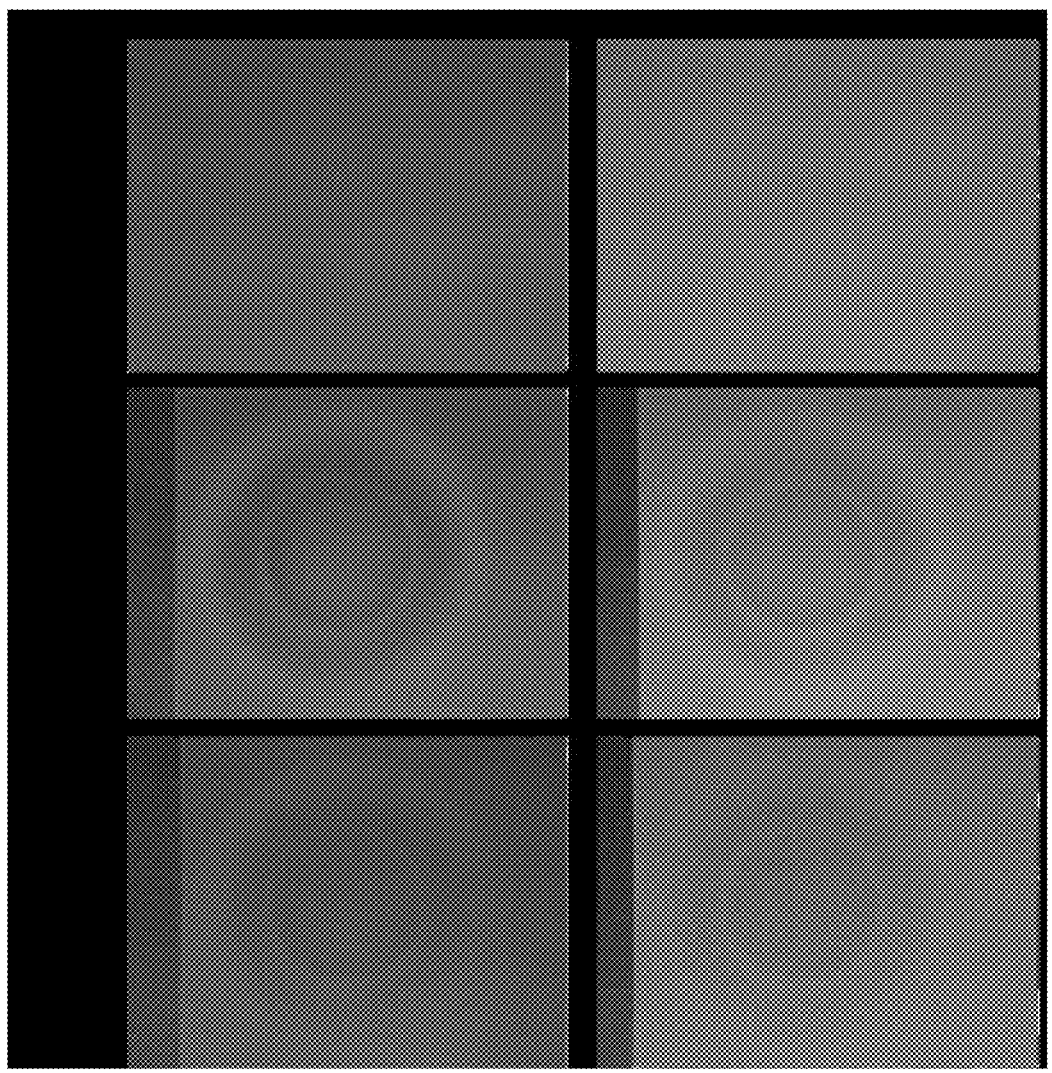
FIGS. 3A, 3B and 3C are photographs showing color-changing effects of the microcapsule according to the present disclosure (left) and the conventional microcapsule (right) printed on a sheet, before the application of a magnetic field (FIG. 3A), after the application of a magnetic field (FIG. 3B), and after UV curing (FIG. 3C)

In order to confirm this, as shown in FIGS. 3A to 3C, the ink including each of two kinds of microcapsules was printed on a sheet, and the color-changing effects thereof were evaluated. In FIGS. 3A to 3C, the microcapsule of FIG. 1C shows that the boundary line of the outer ring thereof appears clear, as seen in the left of FIG. 3B compared to the microcapsule of FIG. 1A including the MTX particles (the right of FIG. 3B) after application of a magnetic field, resulting in higher color contrast effects.

Furthermore, when curing is performed through irradiation with UV light in the state in which the magnetic field is applied, the outline of the ring of the microcapsule according to the present disclosure remains clear (the left of FIG. 3C), whereas the microcapsule including the MTX particles (the right of FIG. 3C) shows unclear color contrast, making it impossible to easily identify the boundary line of the ring thereof.

Although an improved color contrast effect may be obtained even in the microcapsule using the uneven distribution effect of color particles in the capsule containing the color magnetic pigment particles as the color particles, an improvement in color contrast effect may be obtained based on the photonic crystal effect of the MTX particles even in the microcapsule containing the color pigment particles.

The microcapsule according to the present disclosure, having a superior structural color expression effect, may be applied to any type of print or printed medium, namely a print medium in the form of printing ink, or a printed medium such as a security indicia.

Figure 4:
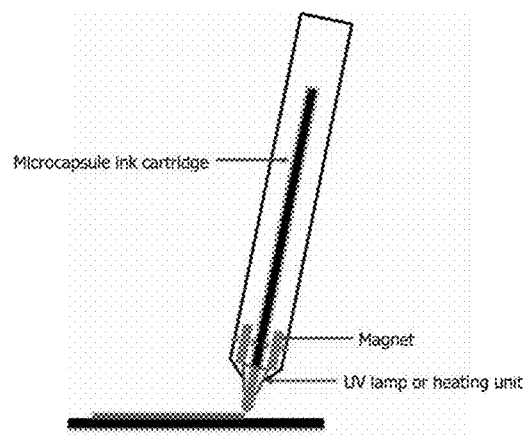
FIG. 4 is a conceptual view showing the principle of operation of a writing tool provided with an ink cartridge, which is an illustration of application of the microcapsule according to the present disclosure to printing ink.

When used as the printing ink, the ink may be stored in the form of a cartridge, and may thus be utilized for a printing device or a handheld printing device such as portable pen. FIG. 4 shows the printing ink using the microcapsule according to the present disclosure.

Specifically, FIG. 4 illustrates a portable pen with a cartridge containing printing ink, in which the microcapsule ink cartridge is provided in the portable pen so that the microcapsule is adsorbed onto the surface of the print medium and thus printed. Also, the microcapsule is adsorbed onto the surface of the print medium and then cured using a UV lamp or a heating unit provided to the tip of a pen or a nozzle.

The UV lamp or the heating unit enables the ink to change into a fixed state (e.g. a solid state, cured state, semi-cured state, etc.) by applying or blocking energy to the ejected ink, whereby electrically charged particles in microcapsules contained in a composition are immobilized to thus fix the formed color, thus realizing structural colors.

Also, a magnet may be provided to the tip of the pen so that a magnetic field is applied to the ink ejected from the ink cartridge, and the spacing between the particles is varied depending on the magnitude of the magnetic field that is applied, and thus the specific wavelength of the reflected light is varied, and thus the distance of the magnet is adjusted, thereby controlling the magnitude of the magnetic field that is applied.

Also, by means of the magnet, a magnetic field is generated before the adsorption of ink onto the surface of a substrate to be printed, whereby the arrangement of particles may be fixed and then adsorbed onto the substrate surface, or alternatively, the ink may be first adsorbed onto the surface of a substrate, and then a magnetic field may be applied from the pen so that the arrangement or disposition of magnetic particles in microcapsule included in the ink adsorbed onto the surface of the substrate may be controlled.

In this case, the printing process may be performed in a manner in which the arrangement of photonic crystal particles immediately before the adsorption of ink is fixed using the magnet, followed by curing and then ejection, or alternatively, in a manner in which the ink is adsorbed onto the surface of the substrate and then the arrangement of the particles is adjusted by applying a magnetic field and simultaneously the arranged particles are fixed by generating energy.

The microcapsules of the present disclosure may also be advantageously used in security indicia. In these cases, the printed medium may serve as security indicia, and may be configured using the microcapsule of the present disclosure, as shown in FIGS. 5A to 5C.

Figure 5:
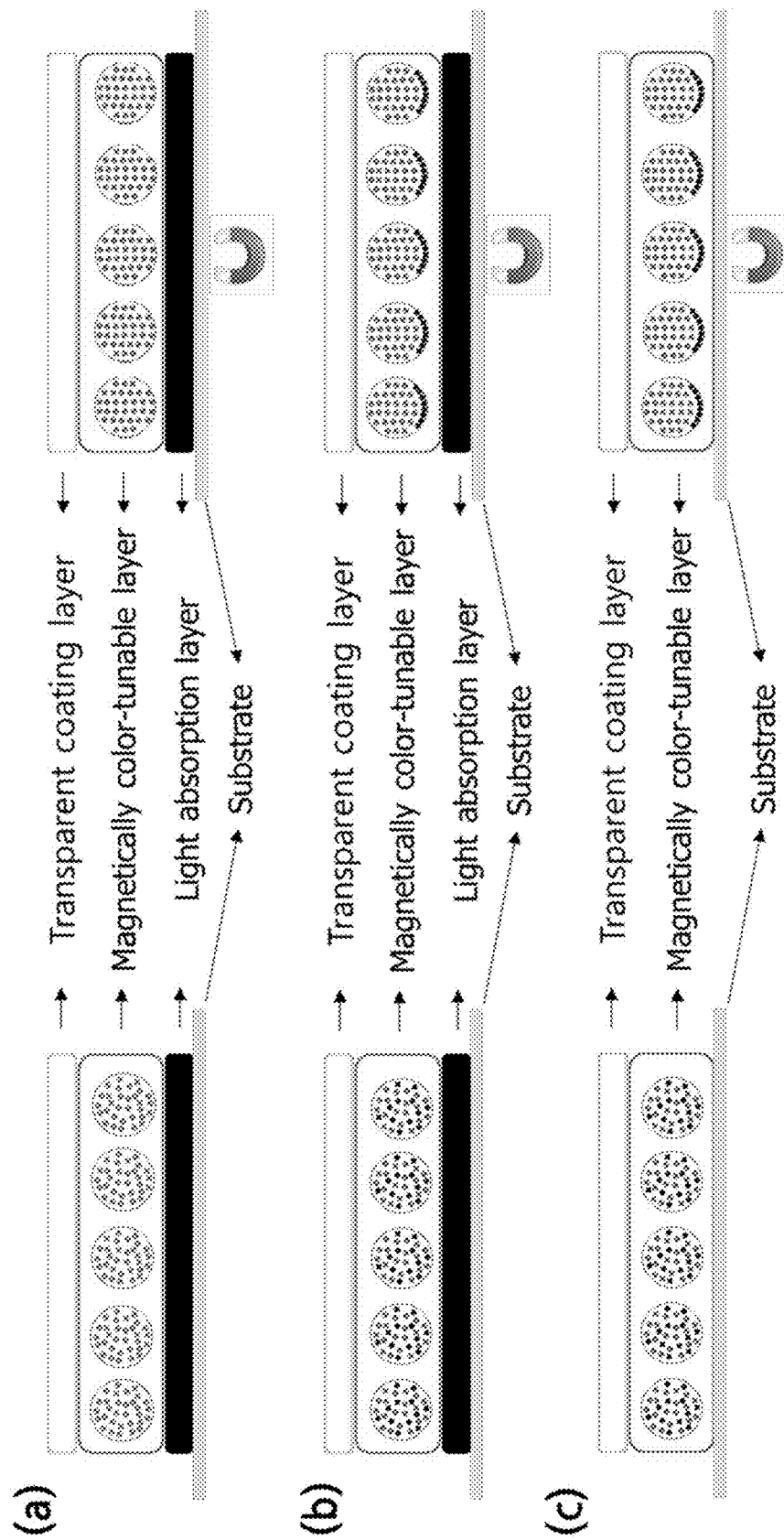
FIGS. 5A, 5B and 5C are cross-sectional views showing the stacking structures of security media (FIGS. 5A and 5B) using the microcapsule according to the present disclosure and a security medium (FIG. 5C) using the conventional microcapsule.

A stack (security indicia) using the conventional microcapsule is configured such that a light absorption layer is formed on a substrate and a magnetically color-tunable layer is formed thereon (FIG. 5C). The reason why the light absorption layer is used is that the wavelength width of reflected light produced by the rearrangement of MTX particles is broad, and thus the specific structural color is not sufficiently realized. Particularly, the light absorption layer acts as the background color, thereby improving the color sharpness realized by the microcapsule.

On the other hand, the microcapsule of the present disclosure may include no light absorption layer, as shown in FIG. 5A, and may include a light absorption layer, as necessary, as shown in FIG. 5B.

In the absence of the light absorption layer, the background color may be formed by the color magnetic pigment particles that are unevenly distributed at the lower portion of the microcapsule, and thus, even when the wavelength width of reflected light generated by the magnetically color-tunable particles is large, color sharpness may be exhibited at a predetermined level. When the light absorption layer is formed, the improvement in color sharpness may become more obvious.

For example, in a microcapsule including MTX particles and black magnetic pigment particles, when a magnet approaches a substrate, the black magnetic pigment particles having high magnetization value are unevenly distributed at the lower portion of the microcapsule, thus exhibiting high color expression compared to when using a conventional printing process. Since printing may be carried out even in the absence of the light absorption layer, the printing process may be shortened, and direct printing onto various substrates becomes possible.

Figure 6:
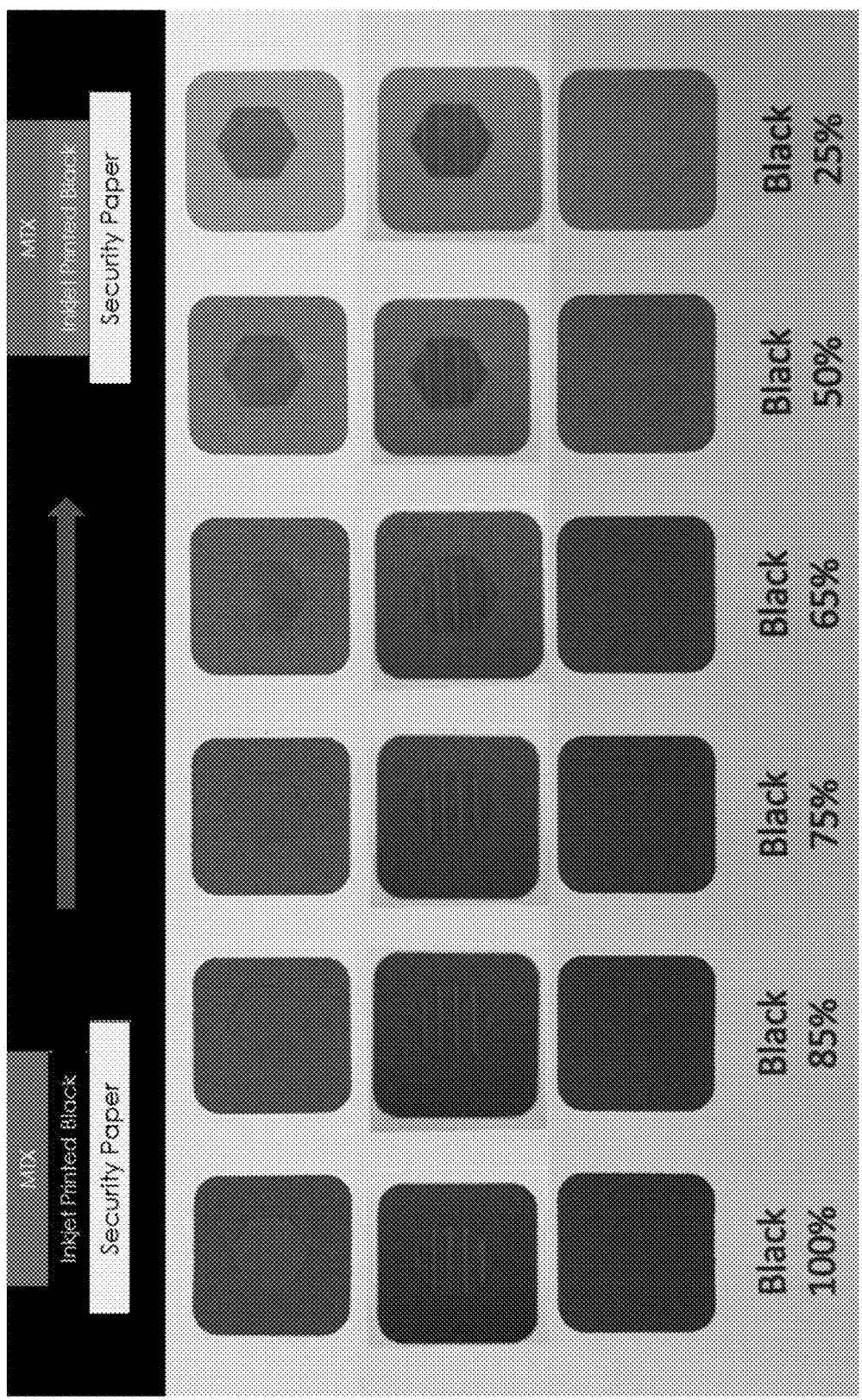
FIG. 6 is photographs showing the structural color expression depending on the blackness of the light absorption layer.

In order to evaluate the structural color expression depending on the blackness of the light absorption layer, as shown in FIG. 6, individual light absorption layers having blackness ranging from 25% to 100% were formed, and ink containing the same kind of microcapsule was applied thereon. As results thereof, even when the blackness is increased, the structural color expression of the microcapsule according to the present disclosure is clearly confirmed.

In contrast, in the microcapsule including only the MTX particles, as shown in the photographs of the third column, the distinction of structural colors depending on the blackness is ambiguous, from which it can be confirmed that color expression is very low.

Figure 7:
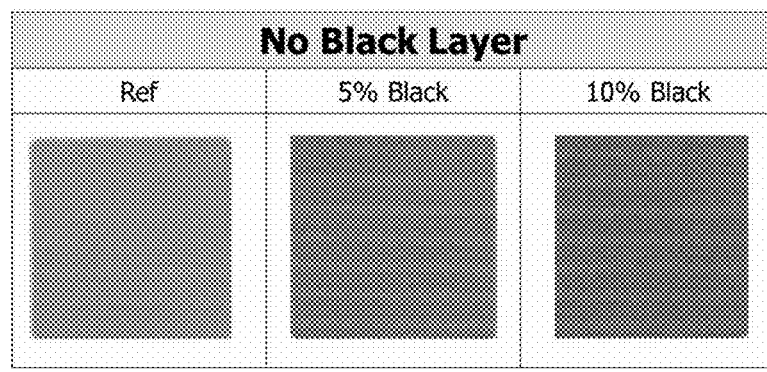
FIG. 7 is photographs showing the structural color expression depending on the amount of black particles contained in the microcapsule.

Also, in order to measure the color expression of the microcapsule itself, as shown in FIG. 7, the proportion of the black magnetic pigment particles contained in the microcapsule according to the present disclosure was set to 5% and 10%, and the results thereof were compared to those of the microcapsule including only the MTX particles (ref).

As results thereof, as the proportion of the black magnetic pigment particles increases, it can be confirmed that the boundary line of a linear pattern is clearly identified, and thus color expression is improved. In particular, it is possible to confirm a significant difference in color expression compared to the microcapsule including only the MTX particles, from which the structural color expression effect of the microcapsule according to the present disclosure can be concluded to be excellent.

In order to evaluate the color contrast effect using the microcapsule according to the present disclosure, a print medium (a), configured such that the microcapsule ink including the color magnetic pigment particles and the magnetically color-tunable particles is printed on a white paper substrate, and a print medium (b), configured such that the light absorption layer is formed with black ink on a white paper substrate and the microcapsule ink is then printed thereon, were prepared.

Figure 8:
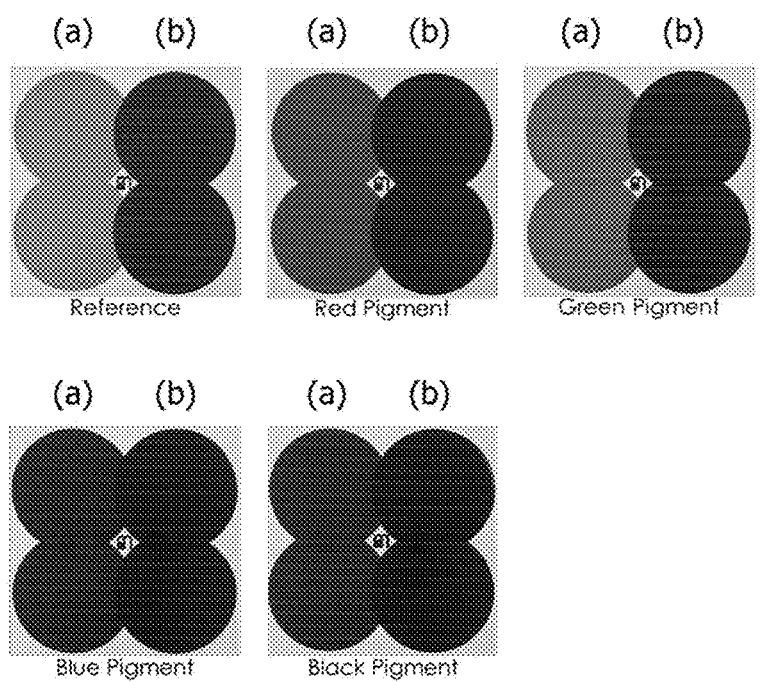
FIG. 8 shows the color contrast effects of microcapsule ink printed on two kinds of print media.

FIG. 8 shows the color contrast effects of microcapsule ink printed on two kinds of print media. In (a) and (b) of Reference, printed with the conventional microcapsule ink including the MTX particles, a brown color appears due to the use of iron oxide as the MTX particles, and a greenish color appears because the wavelength of the reflected light varies in the presence of the light absorption layer. When (a) and (b) of Reference are compared, the linear pattern is clearly seen in the presence of the printed light absorption layer, but the linear pattern cannot be confirmed upon direct printing on the substrate without the light absorption layer, resulting in very low color contrast.

In contrast, in the print media printed with red, green, blue and black ink, the linear pattern may be visually confirmed even upon (a) direct printing on the substrate without the light absorption layer, from which the color contrast effect can be found to be improved. Particularly, in the print media printed with blue and black ink, the color contrast effect can be concluded to be very greatly improved because the discernment of the linear pattern is excellent in the absence of the light absorption layer, compared to when using the conventional microcapsule ink.

Accordingly, in some embodiments, there is provided a security indicia comprising microcapsules as defined in any of the embodiments above. In some embodiments, the security indicia may be a multilayered laminate comprising, in that order, a base layer, a layer comprising the microcapsules as defined in any of the above embodiments, and a transparent protective layer. These layers may optionally be separate by further layer such as adhesive layers or a light absorption layer between the base layer and the layer comprising the microcapsules. The layer comprising the microparticles may further comprise a resin matrix embedding the microcapsules.

Although the more specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

What is claimed is:

1. A microcapsule having a transparent capsule wall material comprising color particles selected from among color magnetic pigment particles and color pigment particles; magnetically color-tunable particles; and a curable solvent.

2. The microcapsule of claim 1, wherein the microcapsule comprises color magnetic pigment particles, wherein the color magnetic pigment particles are configured to unevenly distribute within the microcapsule in response to application of an external magnetic or electric field, and wherein the magnetically color-tunable particles are configured to rearrange to a crystal structure in response to the application of an external magnetic or electric field.

3. The microcapsule of claim 1, wherein the magnetically color-tunable particles are electrically charged nanoparticles.

4. The microcapsule of claim 2, wherein the color magnetic pigment particles are nanoparticles configured to form a light-reflecting or light-absorbing layer in the microcapsule in response to the application of the external magnetic or electric field, and wherein the magnetically color-tunable particles are configured to retain a substantially random distribution of the crystal structures formed in response to the application of an external magnetic or electric field within the microcapsule.

5. The microcapsule of claim 1, wherein the microcapsule further contains at least one of a fluorescent pigment and a thermochromic pigment.

6. A print medium, including the microcapsule of claim 1.

7. The print medium of claim 6, wherein the print medium is an ink further comprising a curable resin composition.

8. A printing device for printing a composition onto a printable medium comprising:
a cartridge including a curable composition comprising microcapsules according to claim 1;
an ejection unit for ejecting the composition from the cartridge;
a magnetic field generation unit for applying a magnetic field to the composition ejected from the ejection unit; and
an energy regulation unit for generating and/or blocking energy for curing the composition ejected from the ejection unit, wherein the energy generated from the energy regulation unit is any selected from the group consisting of thermal energy, light energy, and chemical energy.

9. The printing device of claim 8, wherein the printing device is a handheld writing device.

10. A microcapsule having a transparent capsule wall material comprising therein color particles selected from among color magnetic pigment particles and color pigment particles;
magnetically color-tunable particles; and a solvent,
wherein the microcapsule comprises color magnetic pigment particles, wherein the color magnetic pigment particles are configured to unevenly distribute within the microcapsule in response to application of an external magnetic or electric field, and wherein the magnetically color-tunable particles are configured to rearrange to a crystal structure in response to the application of an external magnetic or electric field,
and wherein the color magnetic pigment particles are nanoparticles configured to form a light-reflecting or light-absorbing layer in the microcapsule in response to the application of the external magnetic or electric field, and wherein the magnetically color-tunable particles are configured to retain a substantially random distribution of the crystal structures formed in response to the application of an external magnetic or electric field within the microcapsule.

11. The microcapsule of claim 10, wherein the magnetically color-tunable particles are electrically charged nanoparticles.

12. The microcapsule of claim 10, wherein the microcapsule further contains at least one of a fluorescent pigment and a thermochromic pigment.

13. A microcapsule of claim 10, wherein the microcapsule comprises color magnetic pigment particles, magnetically color-tunable particles and a solvent; wherein the color magnetic pigment particles are configured to unevenly distribute within the microcapsule in response to application of an external magnetic or electric field; and wherein the magnetically color-tunable particles are configured to rearrange to a crystal structure in response to the application of an external magnetic or electric field.

14. A microcapsule having a transparent capsule wall material, comprising color particles selected from among color magnetic pigment particles and color pigment particles;
magnetically color-tunable particles; a solvent; and a photopolymerization initiator or a thermal polymerization initiator.

15. The microcapsule of claim 14, wherein the microcapsule comprises color magnetic pigment particles, wherein the color magnetic pigment particles are configured to unevenly distribute within the microcapsule in response to application of an external magnetic or electric field, and wherein the magnetically color-tunable particles are configured to rearrange to a crystal structure in response to the application of an external magnetic or electric field.

16. The microcapsule of claim 14, wherein the magnetically color-tunable particles are electrically charged nanoparticles.

17. The microcapsule of claim 15, wherein the color magnetic pigment particles are nanoparticles configured to form a light-reflecting or light-absorbing layer in the microcapsule in response to the application of the external magnetic or electric field, and wherein the magnetically color-tunable particles are configured to retain a substantially random distribution of the crystal structures formed in response to the application of an external magnetic or electric field within the microcapsule.

18. The microcapsule of claim 14, wherein the microcapsule further contains at least one of a fluorescent pigment and a thermochromic pigment.

19. The microcapsule of claim 14, wherein the solvent is a curable solvent.

20. A microcapsule of claim 14, wherein the microcapsule comprises color magnetic pigment particles, magnetically color-tunable particles and a solvent; wherein the color magnetic pigment particles are configured to unevenly distribute within the microcapsule in response to application of an external magnetic or electric field; and wherein the magnetically color-tunable particles are configured to rearrange to a crystal structure in response to the application of an external magnetic or electric field.

\* \* \* \* \*